INVENTOR
ALAN I. FRANK

Dec. 30, 1969  A. I. FRANK  3,487,371
DATA ENTRY SYSTEM
Filed March 3, 1967  7 Sheets-Sheet 5

ALPHABETIC CHARACTERS

| A | B | C | D | E | F | G | H |
|---|---|---|---|---|---|---|---|
| I | J | K | L | M | N | O | P |
| Q | R | S | T | U | V | W | X |
|   |   |   | Y | Z |   |   |   |

NUMERIC CHARACTERS

| 1 | 2 | 3 | 4 | 5 | 6 | 7 | 8 |
|---|---|---|---|---|---|---|---|
|   |   |   | 9 | 0 |   |   |   |

SYMBOLIC CHARACTERS

| + | / | − | \ | △ | ▽ | : | ÷ |
|---|---|---|---|---|---|---|---|
|   |   | . | < | = | > |   |   |

*Fig. 5.*

INVENTOR.
ALAN I. FRANK
BY
Caesar, Rivise,
Bernstein & Cohen
ATTORNEYS.

Dec. 30, 1969    A. I. FRANK    3,487,371
DATA ENTRY SYSTEM
Filed March 3, 1967    7 Sheets-Sheet 6

INVENTOR.
ALAN I. FRANK
BY
Caesar, Rivise,
Bernstein & Cohen
ATTORNEYS.

United States Patent Office 3,487,371
Patented Dec. 30, 1969

3,487,371
DATA ENTRY SYSTEM
Alan I. Frank, Philadelphia, Pa., assignor to Scan-Data Corporation, Norristown, Pa., a corporation of Pennsylvania
Filed Mar. 3, 1967, Ser. No. 620,321
Int. Cl. G11b 13/00
U.S. Cl. 340—172.5
14 Claims

ABSTRACT OF THE DISCLOSURE

An input device for converting handwritten data into machine coded data comprising a means for enabling manual writing of characters and a display means. The display means enables the user to determine whether or not an associated data processing unit has received and converted correctly the handwritten data into machine code.

---

This invention relates generally to input systems for general purpose digital computers and data processing systems and more particularly to a device for recognition of handwritten data and conversion of said handwritten data into machine usable form.

The number of uses for data processing machines constantly increases as their versatility is uncovered. The uses for the data processors would be more greatly increased but for the fact that there is presently a large gap in the data processing field between the input systems of the data processor and the computer portion of the data processor.

That is, the technology is very sophisticated insofar as the internal circuitry and hardware of the computer are concerned. However, although there is presently available input systems for computers that are programmed to accept typewritten data as it is typed, punched card data, and various other forms of coded data input systems, nevertheless, character recognition input systems are still in their infancy. In this respect, as a condition for the recognition of input data, it is necessary that the data be comprised of characters printed from a font of alpha-numeric characters that is already programmed into the computer for recognition thereof. For example, in prior systems, the characters must all be the same size, the style of print must be consistent and the machine must be programmed for the specific character printed. The constraints placed on the printed characters are necessary in order to achieve a high degree of accuracy for the reading of the data otherwise the data is useless for most accounting and business functions.

The provision of recognition circuits for hand-written data which would enable direct insertion of the hand-written data into a computer has been recognized as a desirable ingredient for greatly expanding the versatility and therefore the number of uses for data processing machines. Errorless recognition, however, of handwritten data is virtually impossible unless very rigid constraints are imposed on the writer of the data. Without a high degree of accuracy in recording and recognition, the handwritten input data is useless.

In accordance with this invention, a data entry system is provided which enables virtually 100% accuracy for recording handwritten data and converting the data into machine usable language. A data set is provided which provides a direct feed-back visual display of the characters as they are printed by the user. If the character on display does not agree with that character just written by the user, the user rejects this character and writes the character again.

It is therefore an object of the invention to provide a new and improved data entry system which overcomes the disadvantages of the prior art.

Another object of the invention is to provide a new and improved data entry system.

Another object of the invention is to provide a new and improved data entry system in which handwritten data is directly converted into machine usable data.

Another object of the invention is to provide a new and improved data entry system in which an accurate and immediate feed-back to the operator of the information printed for entry into the computer is provided.

Another object of the invention is to provide a new and improved data entry system which enables a user to handprint information or questions which may be immediately answered by the computer and supplied therefrom in convenient form.

Another object of the invention is to provide a new and improved data entry system which may be used at a plurality of locations each of said locations having equal access to a data processing machine.

Another object of the invention is to provide a new and improved data entry system in which the data entering device enables self-teaching of the use of said device.

Another object of the invention is to provide a new and improved data entry system in which the data entry means used for the data processing system facilitates instruction in various educational activities.

These and other objects of the invention are achieved by providing an input device for entering handwritten data into a machine memory. The device comprises means for manually writing characters. There are provided means responsive to the writing means for recognizing and inserting the character written by the writing means into the memory. A display means is provided adjacent the writing means. The display means is responsive to the insertion means for displaying the character inserted into the memory of the computer.

Figure 1:
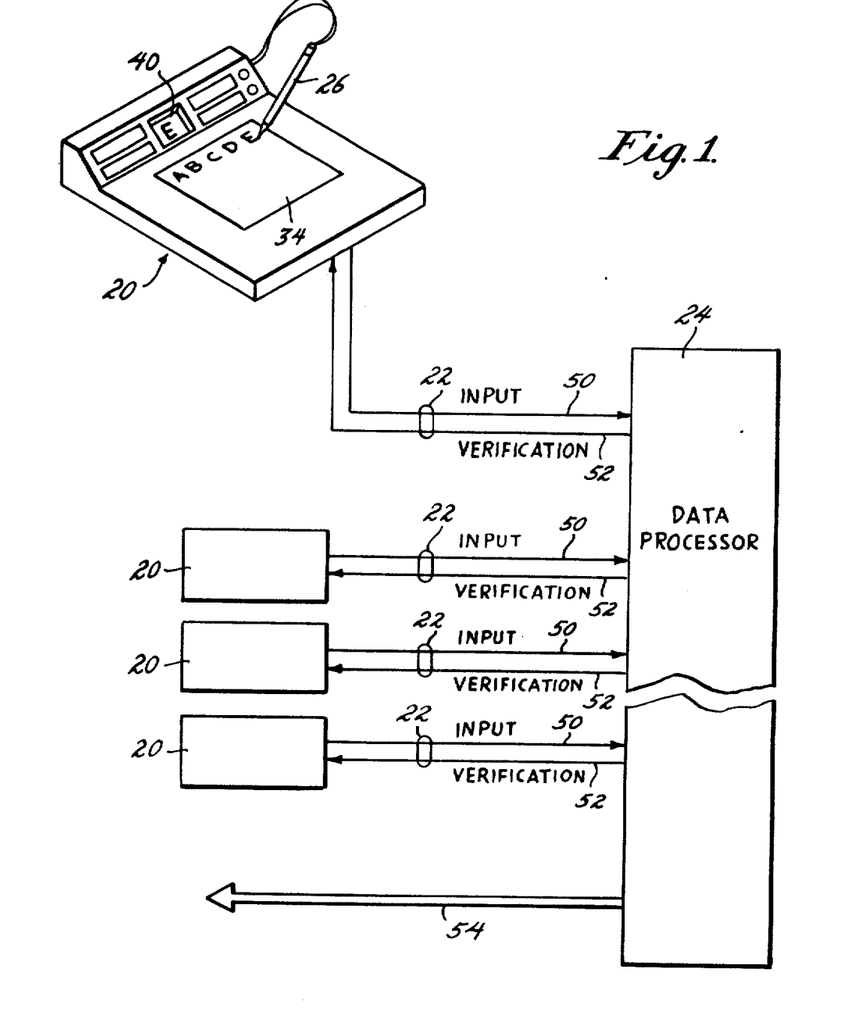
FIG. 1 is a diagrammatic representation of the system embodying the invention.

Other objects and many of the attendant advantages of this invention will be readily appreciated as the same becomes better understood by reference to the following detailed description when considered in connection with the accompanying drawings wherein:

Referring now in greater detail to the various figures of the drawing wherein similar reference characters refer to similar parts, a data entry system embodying the invention is shown in FIG. 1.

The data entry system basically comprises a plurality of data sets 20 which are each connected via a cable 22 to a data processor 24. Cables 22 through preferably representing a plurality of lines may also represent suitable wireless communication channels. Although four data sets 20 are shown in FIG. 1, the number of sets is exemplary only and the number that the system can accommodate is limited only by the size of the data processing unit. That is, the number of data sets which may be used with the data processor is based on the speed and capacity of the data processor and the average time that each of the sets 20 is used.

Figure 2:
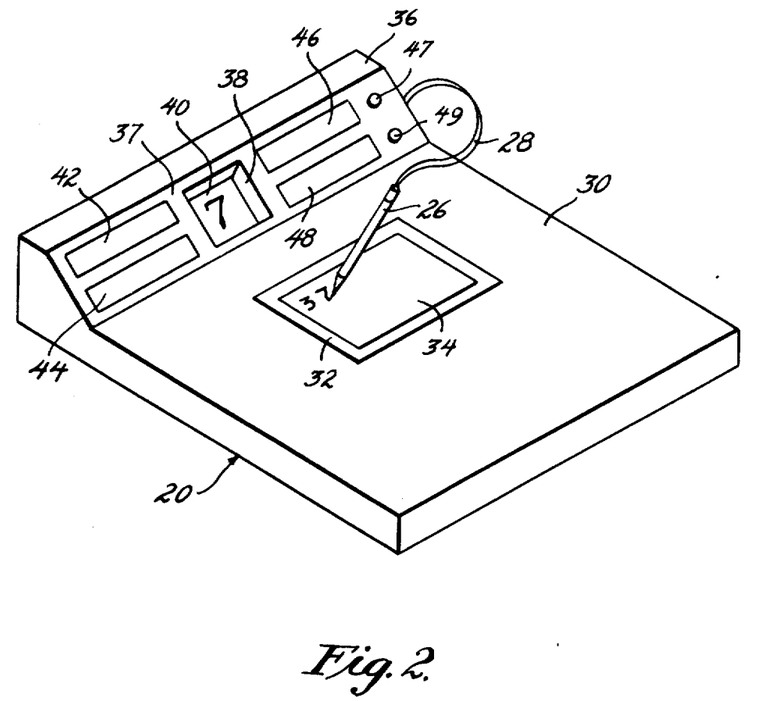
FIG. 2 is a perspective view of a data entry set embodying the invention.

Referring now to FIG. 2 wherein a data set 20 is shown in detail. Each of the data sets 20 includes a pen or stylus 26 which is mechanically linked by a flexible arm 28 to the base 30. The arm 28 is associated with and connected to a pantograph which is located within the base 30 of the data set 20 which is in turn linked to appropriate circuitry for producing a rectilinear signal indicative of the location of the pen 26 with reference to its position above the base 30. The circuitry is preferably comprised of pontentiometers which enable the generation of analog signals proportional to the $x$ and $y$ coordinates which represent the position of pen 26. The type of circuitry which may be used, however, is not limited to analog circuitry.

The flexible arm 28 is constructed in such a manner that the pen 26 may be lifted in a direction normal to the top surface of base 30 without affecting the signal produced by the circuitry associated with the pantograph. Thus, each movement of the pen in a direction parallel to the platen affects the output signal generated by the pantograph circuitry. The circuitry associated with the pantograph may also include circuitry for indicating the direction of movement of the pen 26. In this manner, real time information may be generated by the circuitry.

The base 30 of the data set 20 is generally rectangular and flat and includes along its top surface a writing platen 32. A sheet or pad of papers 34 is provided on the platen 32 for the purpose of entering handwritten information into the computer.

A panel 36 is provided which extends upwardly from base 30 along the rear edge thereof. The panel 36 is of generally trapezoidal cross-section and includes a front wall 37 which faces the user of the data set. Front wall 37 of panel 36 includes a first rectangular opening 38 which is provided adjacent a display 40 and accommodates visibility thereof. Rectangular openings 42, 44, 46 and 48 are also provided in front wall 37 symmetrically located on opposite sides of opening 38. These openings are provided adjacent instruction and/or status indicators and accommodate visibility thereof. Located adjacent opening 46 is a re-entry button 47 which enables data to be re-entered if the data has been incorrectly inserted the first time. Provided below the re-entry button 47 is in indicating lamp 49 which is provided to signal that the data processor is turned on and capable of receiving data.

Display 40 preferably comprises a NIXIE tube. However, the display may also comprise a lamp matrix and electro-illuminescent display, a cathode ray tube, etc. The display 40 is connected to the output of the data processor 24 to display the character which the data processor has last received. Thus, the character last written by pen 26 in sheet 34 is produced on display 40 if the data processor 24 has correctly recognized the handwritten character. If the character is either incorrectly recognized by the data processor or not recognized at all, then the display 40 shows this condition. If the character appearing on the display 40 is not the character last written, the operator merely presses the re-entry button 47 and then rewrites the character until the character displayed is the same as that written.

Referring back to FIG. 1, it can be seen that each of the cables 22 includes input lines 50 and verification lines 52. The signals representative of the location of pen 26 are fed to the data processor 24 via lines 50 from the data sets 20 which are in use. That is, the location of pen 26 of each data set is continually converted by the data set into rectilinear signals by means of the pantograph and the circuitry associated with arm 28. These rectilinear signals are fed via lines 50 of cable 22 to the data processor 24. Where the data sets 20 are remotely located from the data processor 24, the rectilinear signals are converted by a transmitter at the data set to signals more amenable to remote transimssion. The signals are converted back to rectilinear signals by the receiver which is located at the data processor 24.

As will hereinafter be seen, the rectilinear signals received via lines 50 are converted to digital signals by the data processor 24 to enable feature extraction masks to recognize the character written at the data set. When the character is recognized by the data processor 24, the character recognition circuitry generates signals in a combinatorial code corresponding to the character. These combinatorial signals are fed via verification lines 52 back to the data set 20 at which the character has been written. The signals are fed directly to the illuminable segments of the display 40 and combinatorially energize the illuminable segments thereof. The character recognized by the data processor 24 is therefore produced on the display 40 as a result of the signals supplied to data set 20.

The operator of data set 20 compares the character exhibited on the display 40 with the character last written and if it is the same, the operator writes the next character on sheet 34 of the data set. The previous character which has been recognized is then stored in the memory of the data processor 24 or transmitted out of the data processor via an output cable 54 which is connected to an external output device and which is adapted to utilize this information. If the character exhibited on display 40 is not the same as that last written, the re-entry button 47 is pressed and the character is again written. The re-entry button 47 may be pressed each time the wrong character is on display 40, thus assuring that an improper character will not be fed into the memory of the data processor 24 for further utilization thereof.

The data set 20 not only insures virtually 100% accuracy of information inserted into the computer, but also aids as a general teaching tool for the purposes of teaching writing, arithmetic, etc., as well as a teaching tool for the use of the set. That is, the operator cannot enter information until he writes the character in the manner in which it was intended. Thus, it can be seen that not only does the data set enable entry of handwritten information into a data processor, but it also enables the teaching of writing in a manner which enables entry of data.

In one application, a plurality of data sets 20 may be used in a department store for writing up sales tickets and bills. Each of the data sets 20 is connected to the main data processing unit of the department store. Therefore, as the clerks write up bills of sale, the data is simultaneously entered in the data processor and the information is recorded in the central storage of the department store. The computer can then carry out all further accounting functions without further input from the accounting department. Further, the bill for the sale may be mailed immediately by use of computer print-out.

The device also has the added utility of teaching the operator how to properly write the character. That is, unless the character is readable, the character written on the sheet of paper 34 of the data set 20 is not recognizable by the data processor 24. Therefore, the operator must repeat the character written until it is properly displayed in the display 40 adjacent the writing platen.

As will hereinafter be seen, this specifically lends itself to the teaching of writing in schools, as well as to provide an excellent tool for monitoring the progress that a student is making on a daily lesson.

A data entry system utilizing data sets 20 is a useful tool wherever it is necessary to compile from handwritten data information for accounting purposes and other business data. Because the information is stored as it is generated, transcribing the data via a standard keypunch or other entry system is virtually eliminated.

Figure 5:
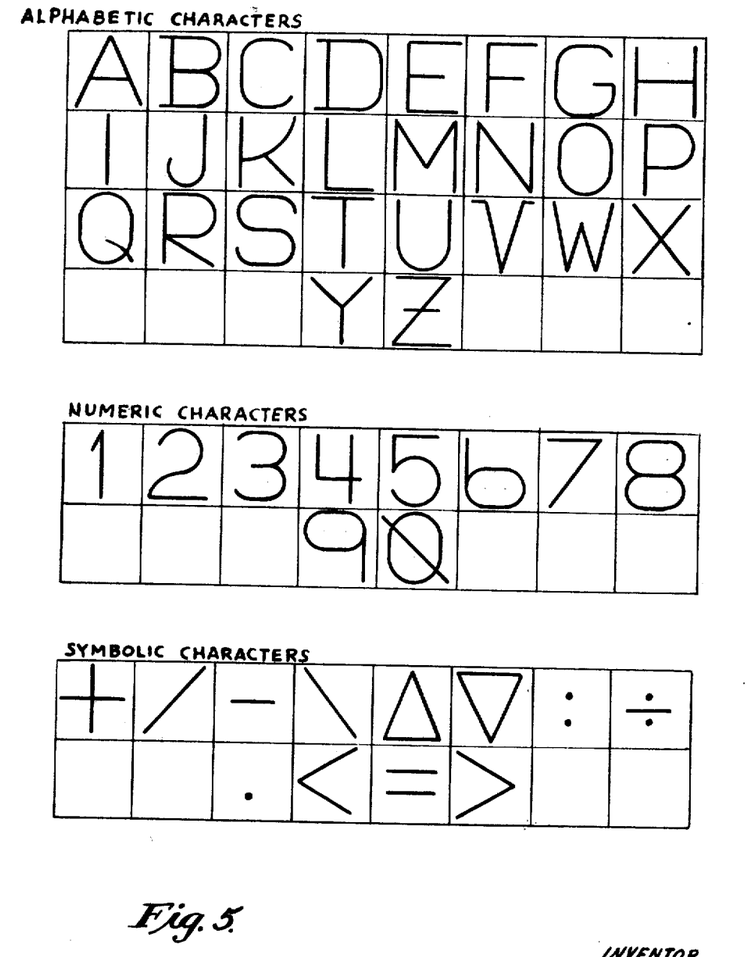
FIG. 5 is a preferred font of alphabetic, numeric and symbolic characters which can be handwritten for entry into a computer system.

The font of characters that is preferably used with the data set 20 is shown in FIG. 5. As can be seen therein, the alphabetic characters are each similar to the characters that are used in ordinary handprinting. In the numeric characters, the only major change is the diagonal splash through the numeral "0." The symbolic characters are also similar to those normally used in printing. The slight deviations in the characters of FIG. 5 from the normal printing mode are preferable to more readily distinguish the characters by a character recognition system without greatly increasing the decision making operations of the data processor. Other fonts of characters, however, may be used in the system. For example, the diagonal slash through the numeral "0" readily distinguishes it from the alphabetic "O" yet with increasing the capability of the data processor, the numeral could be distinguished from the letter by determining its disposition and use. Similarly, the horizontal slash through the "Z" enables rapid distinguishing between the alphabetic "Z" from the numeral "2."

Figure 6:
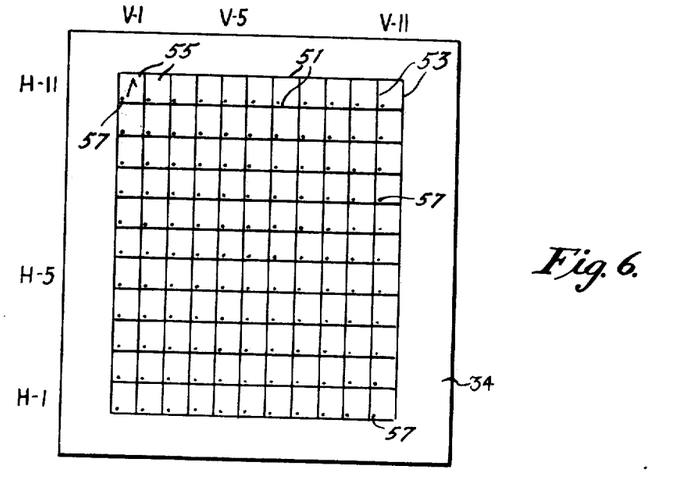
FIG. 6 is a plan view of a preferred sheet that is used on the platen of the data set for data entry.

A sheet of paper which is preferably used with the data set 20 is shown in FIG. 6. The sheet 34 includes horizontal lines 51 and vertical lines 53 which form rectangular blocks 55 similar to those shown about the characters in FIG. 5. Each of the blocks includes a dot 57 in the lower lefthand corner, the purpose of which will hereinafter appear. The dots 57 and the horizontal and vertical lines 51 and 53, respectively, are preferably of a light pastel color so that they are not distracting when reading the information on the sheet 34. The dots 57 need not be used and can be obviated by provision of a reference generator in the computer. It should also be understood that sheet 34 may also be in the form of pre-printed forms such as questionnaires and exams.

The boxes 55 are aligned in vertical columns and horizontal rows. In the exemplary embodiment shown in FIG. 6, there are 11 columns, and 11 rows of boxes which are respectively labeled V1 through V11 and H1 through H11 for ease of reference. The boxes may, of course, be disposed in various formats and may be spaced from each other both horizontally and/or vertically.

It should be noted that the boxes 55 include no guides or references other than dots 57. As will hereinafter be seen, dots 57 enable the establishment of the reference coordinates in the boxes, but do not act in any manner to constrict the writing of the character within the box. The requirement of reference marks to facilitate and insure placement of the character in a proper position within the box are obviated because the operator can verify whether or not the character is recognized prior to placement of the character into storage. Therefore, the system offers far greater speed for transcribing handwritten data in that narrow constrictions are not required for accurate entry thereof. The recognition equipment used in the computer is powerful enough to recognize most forms of handwritten print. The inaccuracy of reading print which is not easily recognized is overcome because the operator observes that the characters poorly written are not recognized correctly by the data processor.

However, it should also be understood that the boxes 55 may also include reference markings which constrict the writing of the characters in the box. But the more constrictive material that is placed in the box, the longer it takes for the operator to write the information into the data processor. However, the use of constricting references does lower the sophistication necessary in the computer program to recognize characters and large savings in hardware and software can be attained by using such constrictions.

Figure 3:
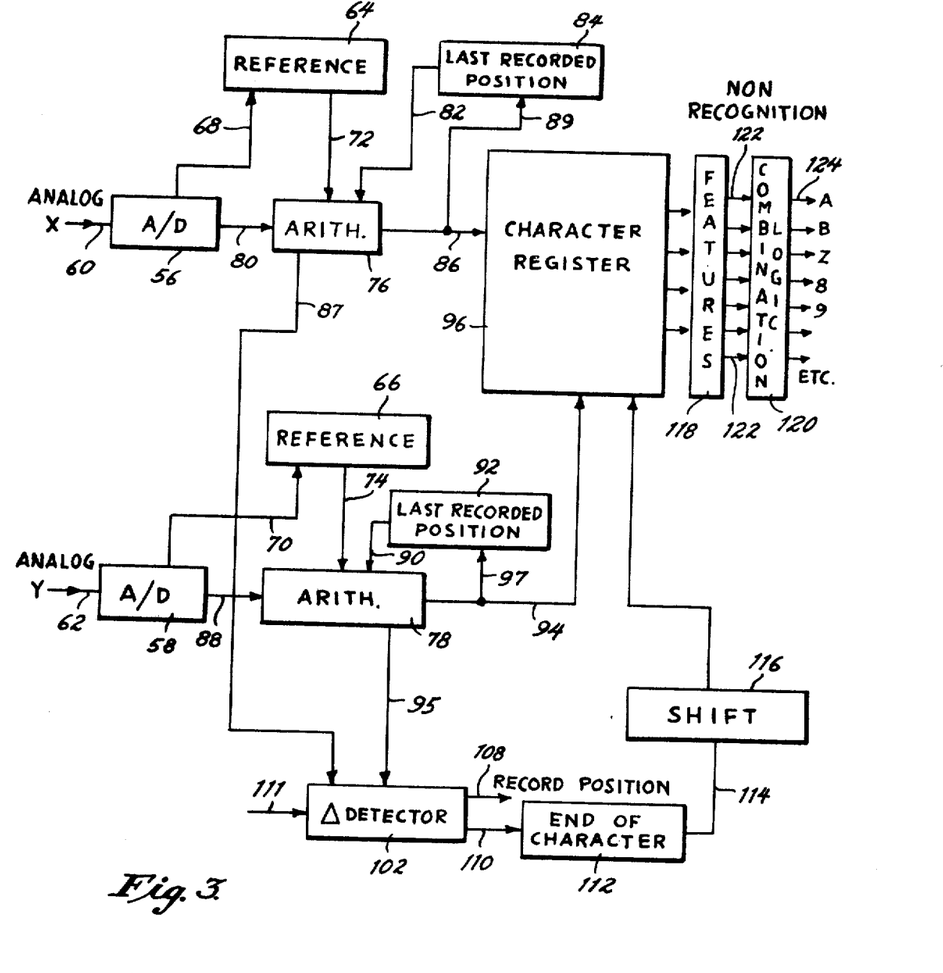
FIG. 3 is a schematic block diagram illustrating the operation of the data entry system embodying the invention.

The operation of the data entry system is more readily understood with reference to FIG. 3 which shows a preferred method of recognition used in the data entry system.

In order to enter data into the computer, the operator merely writes the information on sheet 34. The operator chooses the box in which he desires to start printing the message and first makes contact with pen 26 against the dot 57 which is provided in the lower lefthand corner of each of the boxes 55. The first contact of the pen 26 against a dot 57 causes the platen or pen to generate a first signal which indicates that the pen has made contact with the paper. This signal is hereinafter referred to as a PEN DOWN signal. The signal is transmitted to the data processor 24 as long as the pen 26 makes contact with the paper. This signal enables the transmission of rectilinear signals indicative of the position of the pen 26 with respect to the sheet of paper 34. Thus, assuming that the operator begins by printing the letter "A" in the box 55 at the upper lefthand corner of the sheet of paper, for example, at the intersection of H11 and V1, as shown in FIG. 6, the pen would first be placed at the dot 57 in box 55 and therefore the signals transmitted correspond to the $x$ coordinate and $y$ coordinate of the paper 34 and more specifically to the lower lefthand corner of the box at the coordinates H11 and V1. As will be remembered, these signals are transmitted via lines 50 to the data processor 24.

The data processor is illustrated in functional schematic block diagram form in FIG. 3 and includes a pair of analog to digital convertors 56 and 58. The analog to digital convertor (hereinafter referred to as A/D 56 is connected via line 60 to the generator in the data set 20 of the input signals corresponding to the $x$ coordinate transmitted by the data set 20. The A/D convertor 58 is connected via line 62 to the generator in the data set of the input signals indicative of the $y$ coordinate transmitted by the data set 20. The analog signals on both lines 60 and 62 are continuous so long as the pen 26 remains within the block 55 and is pressed against the sheet 34 and platen 32. However, the pen 26 may be removed and placed back on the platen during the writing of a character and thus one continuous stroke is not necessary for the printing of a character. The A/D convertors 56 and 58 each sample the analog signals on lines 60 and 62 at discrete periods and convert the analog signal into a digital signal corresponding to the rectilinear coordinate of the location of the pen.

The data processor 24 further includes reference generators 64 and 66 which are basically comprised of temporary storage units having selectively non-destructive read-out. The reference generator 64 is connected to the output of A/D convertor 56 via line 68 and reference generator 66 is connected to the output of A/D convertor 58.

It should be noted that the lines depicted throughout FIG. 3 often represent a plurality of lines or in fact represent gating circuitry which connects the output of a specific block to the input of another block. For example, lines 68 and 70, through each single, each represents a plurality of output lines to pass the digital output of the convertors 56 and 58 to the reference generators 64 and 66 in parallel. The lines shown in FIG. 3 are representative of the direction of flow of data and are therefore shown as single lines for the purposes of clarity.

The reference generators 64 and 66 receive the output of the A/D convertors 56 and 58, respectively, only at the initiation of the PEN DOWN signal for a new character. Thus, the reference generators store the initial $x$ and $y$ coordinates of the lower lefthand corner of the box 55 in which the character is being written. The coordinates stored in reference generators 64 and 66 are constantly generated on output lines 72 and 74, respectively. Output lines 72 are connected to the input of arithmetic units 76 and output lines 74 of reference generator 66 are connected to the input of arithmetic unit 78.

The arithmetic unit also receives signals from the output of A/D convertor 56 via output line 80. The arithmetic unit 76 receives each of the remaining signals from A/D convertor 56 during the remainder of the generation of data within a single box 55. Therefore, as seen in FIG.

6, the first reference in the x coordinate would be a result of the operator contacting dot 57 with the pen. This coordinate is fed to the reference generator 64. The x coordinate of his next movement within box 55 would then be fed via line 80 to the arithmetic unit 76. Thus, as the position of the pen moves, the analog signal fed via line 60 to A/D converter 56, corresponds to the position of the pen with respect to sheet 34. The sampled analog signals representative of the x coordinate are thus fed via lines 80 to the arithmetic unit 76 for the remainder of the movement of the pen by the operator within box 55.

The input of arithmetic unit 76 is also connected via input line 82 to the output of a last recorded position generator 84. The last recorded position generator 84 also comprises a temporary storage similar to that used for reference generator 64. Arithmetic unit 76 includes a first output line 86 and a second output line 87. The output line 86 receives the difference between the digital signal on line 80 and the signal on line 72. Thus, the output from the arithmetic unit on line 86 is always the digital signal representative of the magnitude of the reference value less the particular coordinate of the character written. In effect, the value of the digital signal on line 86 is the representation of the x coordinate of the location in box 55. The signals generated on line 87 by the arithmetic unit 76 are equal to the value of the digital signals on line 80 less the value of the signals from line 82. Thus, the output signal on line 87 is equal in value to the difference between the last position and the new position. The output line 86 is connected to the last recorded position generator 84 via line 89. The insertion of the result on line 86 into the last recorded position generator 84 erases the previously recorded signal and makes available the new "last recorded position" for insertion into the arithmetic unit during the next portion of the cycle.

Arithmetic unit 78 is connected to the ouput of A/D converter 58 via line 88. A last recorded position generator 92 is also provided which stores the last y coordinate value. The last recorded position generator 92 is similar to last recorded position generator 84 and the output thereof is connected to the arithmetic unit 78 via output line 90. The arithmetic unit 78 includes a first output line 94 which has generated on it the difference between the reference value stored in reference generator 66 and the digital value generated by the A/D converter 58. The arithmetic unit 78 includes a second output line 95 on which is generated the difference in the digital value from the last recorded position generator 92 and the digital value generated by the A/D converter 58. The output line 94 of arithmetic unit 78 is connected to the last recorded position generator 92 via line 97. Thus, each time a new output signal is generated on line 94, the last recorded position is erased and a new signal is inserted therein which is in turn generated via line 90 to the arithmetic unit 78 for comparison with the output of A/D converter 58.

Output line 86 of arithmetic unit 76 and output line 94 of arithmetic unit 78 are each connected to the input of character register 96.

Figure 7:
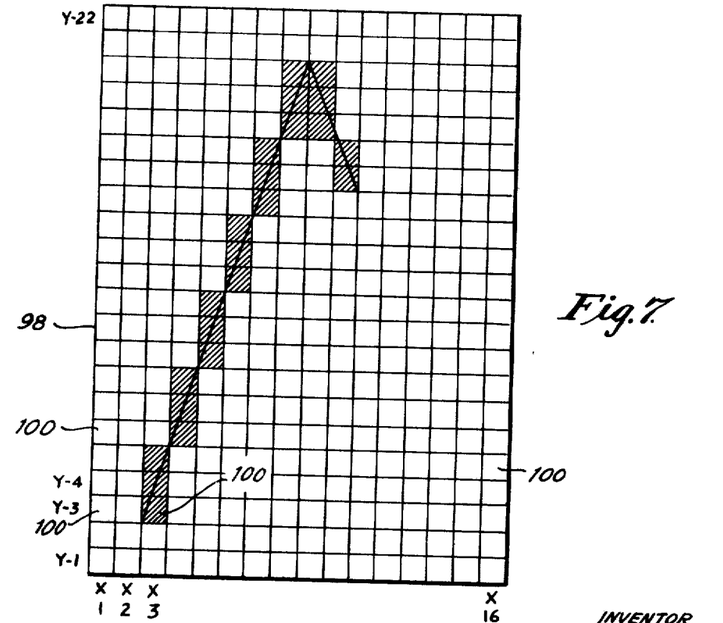
FIG. 7 is a diagrammatic representation of the operation of the shift register.

The character register 96 is comprised of a 352 bit shift register. The stages of the shift register each correspond to a separate physical position within a character box. A diagrammatic representation of the shift register is shown in FIG. 7. The shift register can be thought of as being arranged physically in 22 horizontal rows of 16 bits. That is, a rectangle comprising 22 horizontal rows and 16 columns of rectangular segments. The stages of the register can thus be thought of as being within the rectangle 98 in FIG. 7 which assumes the same shape as a box 55 of the sheet of paper 34 shown in FIG. 6. Each of the stages of the register 96 are represented by one of the square blocks 100 which comprise the rectangle 98. There are thus 352 boxes that comprise the rectangle. For ease of reference, the horizontal rows in FIG. 7 are labeled Y1 to Y22 and are representative of the y co-ordinate within the box 55. Also, for ease of reference, the vertical columns are labeled X1 to X16 and are representative of the horizontal coordinate of the location of the pen within a box 55. It can therefore be seen that each of the stages of the register corresponds spacially to a specific portion of a box 55.

Referring to FIG. 6, it can be seen that in the box 55 which is located in horizontal row H11 and vertical column V1 of sheet 34, the letter A has been started by an operator. As the A is printed by the operator of the data set 20, the data set 20 produces analog signals which are transmitted to the input lines 60 and 62 and which are representative of the horizzontal and vertical coordinates of the location of the pen with respect to sheet 34. As the operator touches the dot 57 with the pen, an x signal and a y signal are supplied to the A/D converters 56 and 58 representative of the location of the dot 57 at the lower lefthand corner of the block 55 in which the character is being written.

As the operator proceeds to write the character within the block 55, the A/D converters 56 and 58 sample the location of the pen with respect to the sheet of paper 34. Since the location of the lower lefthand corner of the box in which the character is being written has been previously supplied to the reference generators 64 and 66 and stored therein, the reference values are subtracted from the A/D converters before the values are applied via lines 86 and 94 to the character register 96. The outputs on lines 86 and 94 are thus the x and y coordinates of the location of the pen within the box with reference to the lower lefthand corner at dot 57.

Therefore, as the character A is started by the operator, the first signal which is generated by data set 20 on lines x and y is representative of the absolute x and y coordinates of the location of the pen with respect to the sheet of paper 34. The x coordinate is supplied in digital form via line 80 to arithmetic unit 76 and is subtracted therein from the reference value which is the x coordinate of the dot 57 in the corresponding box 55. The digital signal thereby applied on line 86 is equal to the difference between the x coordinate of the lower lefthand tip of the letter A and the x coordinate of dot 57. Similarly, the output of line 94 to the character register 96 from the arithmetic unit 78 associated with the y signal is equal to the difference between the y coordinate of the lower lefthand tip of the character A and the y coordinate of the dot 57. Each of the stages of the character register 96 is adapted to be switched from a first or normal state to a second or activated state whenever it receives a signal from both the x and y coordinates. The character register includes addressing equipment so that, for example, if the digital value 3 is supplied via line 86, each of the stages in column x3 receives a first enabling signal. If the digital value of 3 is supplied on line 94, each of the stages of the character register in row y3 also receives an enabling signal. Since two enabling signals are necessary for a stage to be changed from its first to second state, only the stage 100 that is in both column x3 and row y3 is changed in state.

Figure 8:
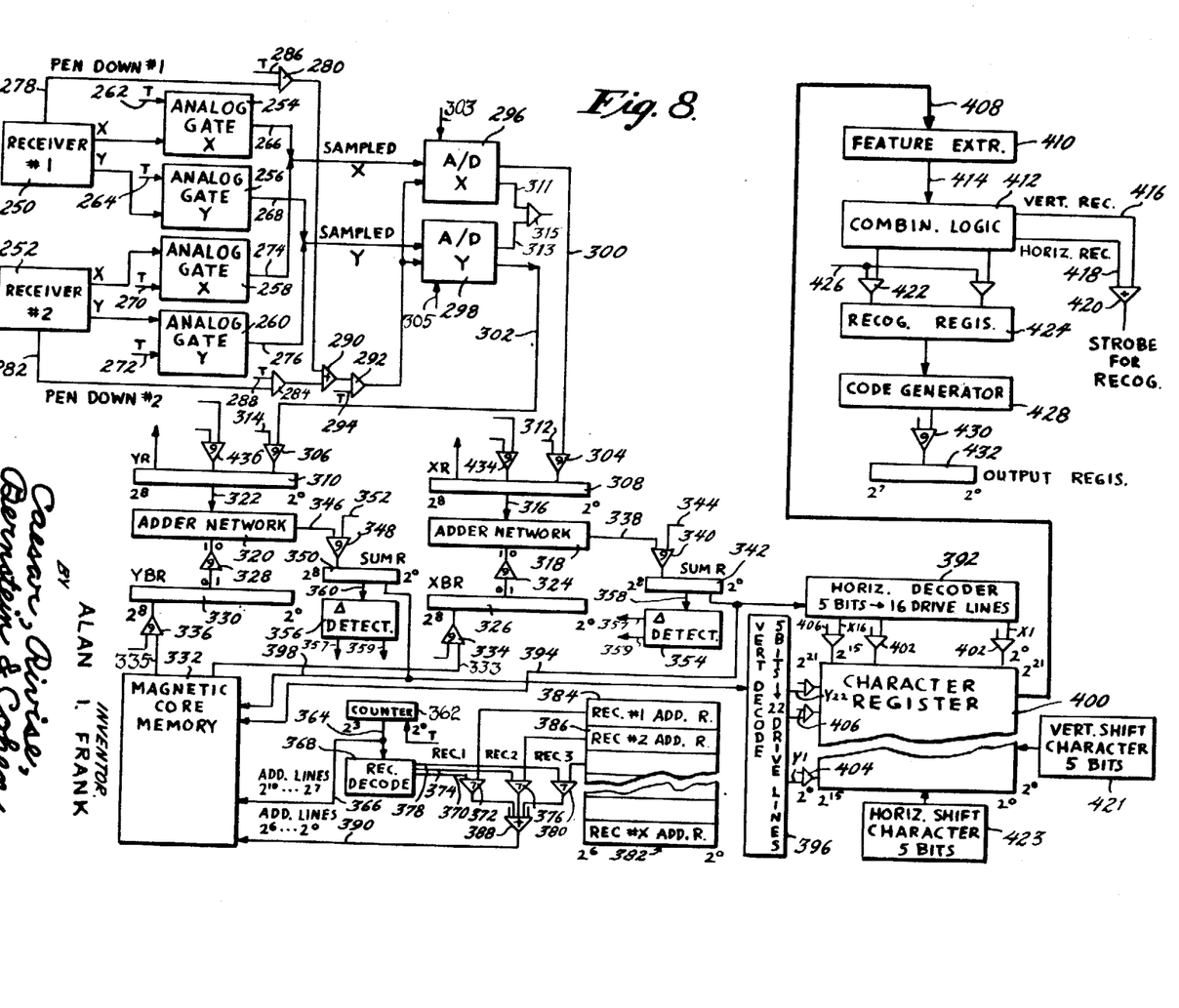
FIG. 8 is a detailed schematic block diagram of a data entry system embodying the invention.

Therefore, as illustrated in FIG. 8, the box 100 which is at the lower lefthand corner of the A, has been changed in state as indicated by cross-hatchings through the box. Similarly, as the position of the pen is sensed as the pen is moved along the line forming the letter A, discrete samples of the position are taken and the coordinates generated by the arithmetic unit 86 and arithmetic unit 94 which indicate the x coordinates and y coordinates within the box through which the line has progressed. Thus, as seen in FIG. 8, the cross-hatchings through the boxes 100 correspond to the stages of character register 96 which have been switched to the activated state. The stages of the character register 96 which are energized thereby enable the recognition of the character being drawn.

As hereinbefore set forth, the dots 57 are provided for the purpose of establishing the coordinates of the box in which the character is being written. While providing the dot 57 is a preferred embodiment, it should be understood that the dot 57 in each of the boxes may be obviated by provision of a reference coordinate storage. That is, a ready-access storage may be provided which generates the reference coordinates of a box as soon as the first coordinates of the position of the pen on the paper is received from the data set. The reference coordinates are generated by comparison of the coordinates generated by the data set with the coordinates provided in the storage. The coordinate in storage closest to these actual coordinates are then generated.

Referring again to FIG. 3, it can be seen that the system further includes a delta detector 102. The output line 87 from arithmetic unit 76 is connected to a first input of the delta detector 102 and the output line 95 from arithmetic unit 78 is also connected to the delta detector. The function of the delta detector 102 is twofold. First, it determines whether or not the pen 26 has moved since the last sample. Second, it determines the end of a character. Thus, if either the x coordinate or the y coordinate is changed, the delta detector produces an output signal on line 108 which is fed to the character register 96 to enable it to receive the output from lines 86 and 94.

As set forth above, the delta detector is also used to provide an indication of whether or not the character has been completed. Where the x coordinate or y coordinate has increased larger than is possible to have the pen stay within the box 55, the delta detector recognizes this condition and provides an output signal on line 110 which is utilized for determination that the character has been completely written so that the character register may receive input information relative to the next character. This second function of the delta detector is supplemented by the use of the PEN DOWN signal information. That is, the termination of the PEN DOWN signal normally indicates the end of a stroke. The delta detector prevents an end of character signal being generated until the pen 26 is located out of the box in which the character is written.

Line 110 is connected to end of character unit 112 which provides instructions for recognition of the character that is formed in character register 96. The end of character unit 112 is connected via line 114 to a shift generator 116. The shift generator 116 is connected via line 117 to the stages of character register 96 and provides shift pulses to enable movement of the character within the character register 96 until the character is recognized by feature extraction masks 118 which are connected combinatorially to the outputs of the various stages of register 96 and logic combination circuitry 120 which is connected to the output of masks 118. After recognition of the character in the character register has been made, the contents of character register 96 is erased by the shift generator 116 which provides shift pulses to erase the contents of the shift register.

The feature extraction masks are connected to the various stages of shift register 96 in combinatorial fashion. The feature extraction masks are preferably of the type shown in my co-pending application Ser. No. 544,202, filed Apr. 21, 1966 and are connected to the register 96 in the same manner. Basically, each of these feature extraction masks is connected to a specific combination of stages in the character register. If a predetermined number of these stages is changed from the first to the second state, the feature is detected and an enabling signal is provided on one of the output lines 122 corresponding to that feature. The combination of specific features which are present enables the determination of the character that has been stored in the character register 96.

Lines 122 are connected to the combination logic 120. The combination logic 120 determines from the combination of lines 122 which have enabling signals, the character which has been stored in the character register 96.

The combination logic circuitry includes a plurality of output lines 124. Each of lines 124 corresponds to a different one of the characters which can be detected. For example, when the letter A is presented to character register 96 and is recognized as such by the combination logic circuitry, an output signal is provided on the line 124 corresponding to and labeled in FIG. 3 with the letter A. If the character inserted into character register 96 is not recognizable, then, of course, none of the output lines from the combination logic circuitry would be energized.

The output lines of the combination logic circuitry are connected to a converter which generates a combinatorial signal corresponding to the character which has been recognized. The combinatorial signal represents the character in a segment form so that the signal can be utilized to illuminate the display of the data set. This converter supplies the signals via the vertification lines 52 of cable 22 back to the data set 20 which originally supplied the information to the character register. The signals on the verification lines 52 are supplied directly to the illuminable elements of the display 40 and energize combinatorial elements thereof so that the character which has been written is displayed. If the character displayed is not the same as that last written by the operator, the re-entry button 47 is pressed and the character is written again. If no character appears in the display 40, it indicates that the character was not recognized at all and the operator would also press the button 47 to re-enter the character. If the re-entry button is not presssed, the character which was written on sheet 34 is recorded in the memory of the data processor and may also be transmitted via cable 54 for utilization by printing equipment or other types of data processors.

It can be seen that by using rectilinear signals to produce the x and y coordinates of the pen, the equipment necessary is minimized and the conversion into digital signals is facilitated. The character coordinates are stored easily in the character register 96 whereupon the character may be recognized by the character recognition techniques shown in my aforementioned co-pending application.

Because there is real time generation of the data, more powerful techniques of recognition can be used to supplement or be substituted for the preferred character recognition technique which is shown in my co-pending application. For example, contour following techniques can be used which follow the path of the pen as the handwritten data is generated. The contour following technique can supplement the feature extraction techniques or be used by itself to determine and recognize the characters as they are printed. Thus, the real time generation of data enables and further facilitates recognition of the handwritten data.

The use of the display 40 enables the operator to enter handwritten data into the data processor 24 for use thereafter for accounting or other purposes with the assurance that the input is virtually 100% accurate. The type of characters used by the operator does not require expert handwritting and the restraints are mild.

In a preferred embodiment, the boxes in which each character is written are ⅜" squares. The boxes are needed only as guides and the variance in the size of the characters does not affect the recognition thereof if the characters are produced without a large variance in size. While it is required for recognition that the general outline of the characters approximate the characters shown in the font of characters in FIG. 6, it is not required that the character strokes touch or meet at specific spots.

The character written is immediately fed back to the character display after the character is written which assures the virtual 100% accuracy. If the character displayed does not coincide with that just written, or if a character non-recogntion should occur, it is immediately fed back for operator regeneration. The errors can then immediately be detected and overcome by the operator and the proper character re-entered into the system and reverified by the operator when it is regenerated back to the display 40.

This system also overcomes the handicap that the operators can not be taught quickly enough to properly write so that the information can be accurately recognized by the data processor 24. This system overcomes these disadvantages by timely feed back of the character to the display as each character is written. The operator can then compare the manner in which the character was written with the preferred front to see the differences therein when the character has not been accurately recognized. The data set, thus, not only provides 100% accuracy in entry of handwritten data into the data processor, but also facilitates teaching the operator of the system.

Another advantage of this system is that all of the characters as well as control functions are generated by the writing instrument in a normal writing mode. This maximizes operator efficiency in that the operator is familiar with the characters and control functions as they are conventionally used in everyday writing. The paper sheets used on the platen are preferably preprinted so that various formats can be employed. This further maximizes the number of uses to which the data entry system may be put. A typical example of a use for this system is in department stores wherein each salesperson has a data set at his disposal. The salesperson can enter the information from a chargecard which is presented to him and then record the transaction. Since the data set is connected to the accounting system of the department store, if the card has been stolen from someone esle and a complain registered, the computer immediately issues a warning to the data set. This warning preferably is seen at the status indicators or at the character display in the form of a warning character. Similarly, if the present buyer has failed to pay his bills for a long period of time, the computer recognizes this and issues a signal to the salesperson not to complete the sales order. If the credit check run in the data processor on the credit cord owner proves negative and that the credit card owner is in effect still considered a person whose credit is honored, the transaction can proceed and the data processor immediately has the bill registered. The computer system is then used to send the bill immediately to the buyer's home.

It can therefore be seen that the data set can be of extreme value in any place where accounting functions are related to sales. The personnel need not be trained extensively in the use of the device. Thus, inexperienced personnel throughout a business can use the device with little training.

Figure 4:
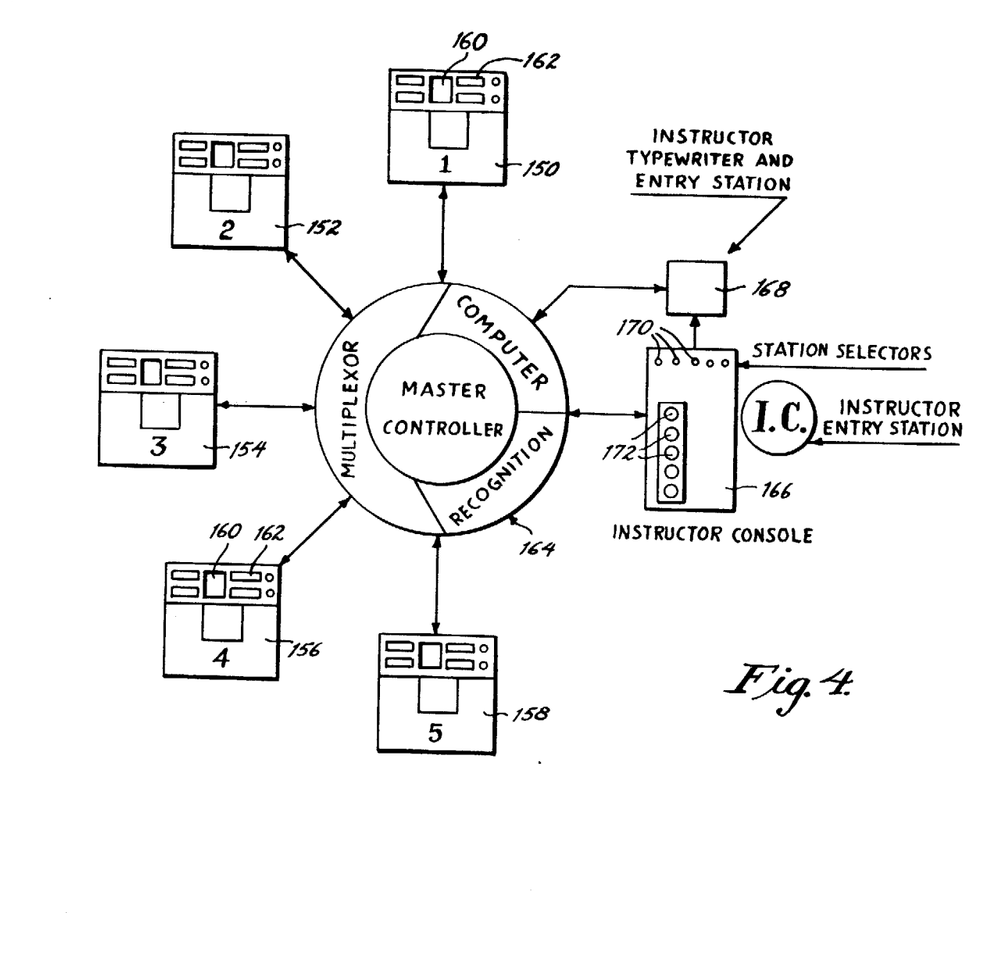
FIG. 4 is a schematic block diagram of a data entry system embodying the invention.

A specific example of a data entry system embodying the invention is illustrated in FIG. 4. The system shown in FIG. 4 is preferably used for educational purposes.

As seen therein, the system shows the use of five stations 150, 152, 154, 156, and 158. Each of the stations is preferably comprised of a data set 20 shown in FIG. 2. Each of the stations therefore includes a character display 160 and a plurality of status indicators 162. Each of the statio ns are connected to a master controller 164. The master controller 164 is basically a data processing unit which includes, inter alia, a multiplexing unit, a recognition unit and a computer section. The stations 150 to 158 are each connected to the master controller via the multiplexer which strobes each of the five stations for simultaneous entry to the computer of the information generated at each of the stations. Also connected to the master controller is an instructor console 166 and an instructor typewriter and entry station 168. The instructor console 166 includes switches 170 and displays 172 corresponding to each of said switches which enable the instructor to monitor each of the display units of stations 150, 152, 154, 156 and 158. Each of the switches 170 correspond to a different one of the displays 160 of the stations 150 through 158.

By pressing the switch 170 corresponding to station 150, the character exhibited on the display 150 of the student's station also is displayed at the same time on the display 172 corresponding to station 150 on the instructor's console 166.

Lessons are inserted into the computer of the master controller 164 by typing the information in the entry station 168. The entry station 168 may also comprise a data set 20 for insertion of the data in handwritten form.

The status indicators 162 of each station can be controlled via the instruction console 166 so that the instructor can provide information and instructions to the students. Thus, a teacher can provide signals to the student to indicate that he is proceeding correctly and to continue or that the completed portion of the student's lesson has been done incorrectly and to discontinue until the teacher comes over and helps him.

The system is particularly useful for teaching children to write and to learn arithmetic. Writing is taught by having the children print in the boxes on the platen of the data entry set the lessons which they are learning to print. If the same letter is exhibited in the display 160, the child knowns that he is printing correctly. Similarly, the instructuor can also monitor the student and determine whether or not the student is printing correctly and if not, give individual instruction to the student to see what is not being done correctly.

Arithmetic is facilitated in that the student writes out the problem on the platen and can see that he is entering the problem correctly on the character display 160. The computer then checks the result which the student puts down to see whether or not the problem has been solved correctly. The correct result products a signal generated by the computer on the status indicators 162 that the student should continue on the next problem.

The teacher is provided with a tool having great flexibility in that instructions may be given individually to each of the students via the status indicators on each of the data sets. Moreover, the teacher is freed to devote a longer amount of time to the poorer student because instructions may be programmed into the computer via the data entry set. Thus, the data sets provide the better students with an entire lesson while the teacher is personally devoting his time to the slower student.

The information placed by the student into the computer via the data set is not only checked by the student for determination that the data has been entered into the computer correctly, but also the accuracy of receipt of the data and the content of the data are checked by the computer. That is, the computer is also able to determine the correctness of the solution provided by the students to assigned problems.

A data entry system embodying the invention is shown in detail in FIG. 8. The system of FIG. 8 uses multiplexing to enable use of a large number of data sets simultaneously.

The system of FIG. 8 includes a pair of receivers 250 and 252 which receive the signals from a first and second data set. Where the signals are transmitted to the receivers in other than rectilinear form, the receivers preferably include transducers for converting the incoming signals to rectilinear signals. The receivers thus generate $x$ and $y$ coordinate signals representative of the position of pen 26. A pair or receivers are shown in the system of FIG. 8 for the purpose of clarity. However, it should be understood that a larger number of receivers can be used in accordance with the principles of the invention. The first receiver 250 is associated with a pair of analog gates 254 and 256. The second receiver 252 is associated with a pair of analog gates 258 and 260. The $x$ output signal line of receiver 250 is connected to the input line of analog gate 254 and the $y$ output signal line from receiver 250 is connected to the input line of analog gate 258. The $x$ output signal line of receiver 252 is connected to the input line of analog gate 258 and the y output signal line of receiver 252 is connected to the input line of analog gate 260.

Each of the analog gates 254 and 260 includes a timing input line. Timing input lines 262 and 264 are connected to the analog gates 254 and 256, respectively. The input lines 262 and 264 are each pulsed simultaneously so that the analog gates 254 and 256 are sampled simultaneously to pass the x coordinate and y coordinate signals to output lines 266 and 268, respectively. Timing input lines 270 and 272 are connected to the analog gates 258 and 260, respectively, and are pulsed simultaneously but are pulsed by signals out of phase with or spaced in time from the signals supplied to input lines 262 and 264. The x and y coordinate output signals from receiver 252 are then passed to output lines 274 and 276.

Receiver 250 also emits a signal on output line 278 which indicates that the pen 26 is placed in contact with the platen of the data set. Line 278 is connected to an input line of gate 280.

Gate 280 is an AND gate and is adapted to be enabled when both input lines are pulsed. Each of the triangular gates shown in FIG. 8 with the exception of those having the symbol "+" therein is an AND gate including those having a numeral therein. Those AND gates having a numeral therein represent a plurality of AND gates of the number indicated within the triangle. That is, where the numeral nine is provided within an AND gate, the gate represents nine AND gates. Those gates having the symbol "+" therein are OR gates and are adapted to be enabled by a pulse on either or both of its input lines. Where a triangular gate includes only a single input, the logic function of the gate is to invert the signals at its input. Thus, where a positive pulse is applied to the inverter gate, it is inverted to a ground signal and, conversely, the ground signal applied to the input of the gate is inverted to a positive pulse.

Receiver 252 produces signals indicative of the PEN DOWN condition on an output line 282 which is in turn connected to gate 284. Gate 280 also includes a timing input 286 which is pulsed simultaneously with gates 262 and 264. Similarly, gate 284 includes a timing input line 288 which is pulsed simultaneously with input lines 270 and 272. The outputs of gates 280 and 284 are fed to an OR gate 290 which produces an output signal when either gates 280 or 284 have been enabled.

The output of gate 290 is connected to input gate 292 which also includes a timing input line 294. Timing input line 294 is pulsed whenever either of lines 262 and 264 are pulsed as well as whenever timing lines 270 and 272 are pulsed. The output lines 266 and 274 of analog gates 254 and 258, respectively, are connected together to the input of analog to digital converter 296. The output lines 268 and 276 of analog gates 256 and 260, respectively, are connected together to the input of an analog to digital converter 298. The analog to digital converter 296 converts the analog signal supplied at its input to a digital signal which is generated on output line 300. Similarly, the analog signal representing the y coordinate which is applied to the analog to digital converter 390 is converted to a digital signal which is generated on an output line 302 of the converter. Timing input lines 303 and 305 are connected to A/D converters 296 and 298, respectively. Pulses are provided on lines 303 and 305 to maintain synchronization between the A/D converters and the associated gating circuitry.

Output line 300 actually represents nine output lines which receive the digital signal in parallel. Each of lines 300 is connected to an input gate 304, only one of which is shown with the numeral "9" therein for the purpose of clarity. The line 302 also represents a plurality of output lines so that the digital signal thereon is generated in parallel. Each of the lines is connected to an input gate 306. Gates 304 are each connected to a stage of an x storage register 308. Each of the gates 306 is connected to a stage of a y storage register 310.

Timing lines 312 and 314 are connected to the inputs of gates 304 and 306, respectively, and enable the gates to transfer the signals on lines 300 and 302 to the x register 308 and the y register 310, respectively. A/D converters 296 and 298 further include sensing lines 311 and 313, respectively, which are each connected to an input of gate 315. The gate 315 is enabled only upon receipt of both the x and y coordinate signals. The output of gate 315 is utilized by the control circuitry (not shown) for generating further control signals and timing signals for the proper transfer of the data throughout the system.

Register 308 is connected via lines 316 to an adder network 318. The register 310 is connected to adder network 320 which is part of the arithmetic unit via output lines 322. Adder network 318 is also connected via inverter gates 324 to the output of reference register 326. The adder network 320 is connected via inverter gates 328 to a reference register 330. Registers 326 and 330 are each connected to input lines 333 and 335, respectively, from a magnetic core memory 332 via gates 334 and 336, respectively. The adder network adds the inverted contents of the registers 326 and 328 to the new coordinates stored in the registers 308 and 310, respectively, the effect of which is the subtraction of the former from the latter.

The magnetic core memory 332 is comprised of a plurality of temporary storage registers which record the x and y coordinates representative of the positions of the pens 26 of each of the data sets. Thus, the initial x coordinate and y coordinate for the first receiver 250 is stored in a first register in the magnetic core memory. Similarly, an initial reference for the x and y coordinates is stored in the magnetic core memory in another register indicative of the initial coordinates of the second receiver 252. At positions adjacent these registers are stored the remaining x and y coordinates of the first and second receivers. Similarly, registers are provided in the magnetic core memory 332 for each additional receiver that is being used to record the x and y coordinates of all the positions that their respective associated pens have traversed.

The adder network 318 is connected via output lines 338 to nine gates 340 only one of which is shown for purposes of clarity. Gates 340 are each connected to a different one of the stages of the sum register 342. Each of gates 340 also includes a timing input line 344 which upon receipt of a timed pulse signal, enables the gates to transfer the contents of the adder network into the sum register 342. The adder network 320 is connected via output lines 346 to nine gates 348, only one of which is shown for purposes of clarity. Gates 348 are each connected to a different one of the stages of a sum register 350. Each of the gates 348 also includes a timing input 352 which when pulsed, enables the gates to transfer the contents of the adder network 320 to the sum register 350.

The system of FIG. 8 also includes a pair of delta detectors 354 and 356. Delta detector 354 is connected to the output line 358 of sum register 342 and delta detector 356 is connected to the output line 360 of sum register 350. The detectors 354 and 356 act to determine whether either the x or y coordinate has changed since the receiver has last been sampled or whether the x or y coordinate has exceeded the limit within a box. That is, if the x coordinate is greater than sixteen (16) or the y coordinate is larger than twenty-two (22), the delta detector 354 or delta detector 356 indicates that a complete character has been received.

Each of the delta detectors includes a pair of output lines 357 and 359. Output lines 357 provide the signals indicative that the x or y coordinate has changed. The signals generated on lines 359 indicate the end of the character.

A constantly recycling counter 362 is provided for enabling the storage of the coordinates from the output of the sum registers at the proper position in magnetic core memory 332. Counter 362 is connected via four output lines 364 to address lines 366 of magnetic core memory 332 and to a receiver decoder 368. The receiver decoder 368 includes an output line 370 which is connected to an input of each of a plurality of gates 372. The receiver decoder also has an output line 374 which is connected to each of a plurality of gates 376 and an output line 378 which is connected to each of a plurality of output gates 380. Only one of each of the gates 372, 276 and 380 is shown for purposes of clarity. A receiver address memory 382 is associated with output gates 372, 376 and 380. The receiver addresss memory 382 is comprised of a plurality of counter storage registers each adapted to store a portion of the address in the magnetic core memory at which the coordinate generated by the receivers may be stored. That is, the memory 382 includes a first register 384 which stores a portion of the address in the magnetic core memory at which the coordinates generated by the receiver 250 are stored. A second register 386 stores a portion of the address for the location in magnetic core memory 332 at which the reference coordinate generated by the second receiver 252 is stored. Similarly, the memory 382 includes a register for the portions of addresses at which the reference coordinates generated by each additional receiver is stored. As will hereinafter be seen the remaining portion of an address in the magnetic core memory is generated by counter 362.

Each of the counter registers 384, 386 . . . of the memory 382 is connected to output lines 357 of delta detectors 354 and 356. The memory 382 includes appropriate gating circuitry to enable the signals on line 357 to increment by one (1) the count in the selected register. That is, where the delta detector 354 or 356 generates a signal on either of lines 357 to indicate that the $x$ or $y$ coordinate from a particular receiver has changed, the address register in memory 382 associated with the receiver is incremented by one (1) in order to change the location at which the new coordinate is stored in magnetic core memory 332.

Each of the stages of register 384 is connected to an input of one of gates 372. Each of the stages of register 386 is connected to an input of one of gates 376 and the stages of the next register are each connected to an input of gates 380. A set of gates similar to gates 372, 376 and 380 are provided for each of the registers provided in the receiver address memory 382. Each of these sets of gates are connected to the inputs of a set of OR gates 388. That is, seven OR gates 388 are provided, each having an input connected to the output from one gate of each set of gates 372, 276, 378 . . . . Thus, one gate 388 would have a first input connected to the output of one of the gates 372, a second input connected to the output of one of the gates 376, a third input connected to the output of one of the gates 380 and so on.

Decoder 368 is responsive to the count in register 362 to enable selective groups of gates 372, 276 and 380. That is, at a preselected count in counter 362, decoder 368 provides a signal on line 370 which enables each of gates 372 to transfer the contents of register 384 to gates 388. The output lines of gates 388 are each connected to a different one of address lines 390 to the magnetic core memory 332.

Address lines 366 and 390 provide the total address to the magnetic core memory 332. The address lines 366 provide the four most significant binary digits ($2^7$ to $2^{10}$) and the lines 390 provide the seven least significant binary digits ($2^0$ to $2^6$) of the address.

The magnetic core memory 332 is connected to output lines 359 of the delta detectors 354 and 356, respectively. When the delta detectors generate a signal on either of lines 359 indicating that the character is completed, all of the information stored in the magnetic core memory at the addresses associated with the receiver at which the character is completed are read out of the magnetic core memory 332. As will hereinafter be seen, this, in effect, "dumps" the stored information relative to the character into the circuitry provided for recognizing the information presented to the data processor.

The sum register 342 is connected via its output lines to the input of magnetic core memory 332 via lines 394. The output lines of sum register 342 are also connected to a horizontal decoder 392. The sum register 350 is connected to a vertical decoder 396 and to magnetic core memory 332 via output lines 398. The horizontal decoder 392 converts the input signal applied thereto from a multibit code into an output on one of output lines $x1$ to $x16$. Decoder 396 similarly converts the multibit code provided at its input lines to a single output on one of output lines $y1$ to $y22$. Output lines $x1$ to $x16$ and $y1$ to $y22$ are connected via input gates to a character register 400. Character register 400 is similar to character register 96 and includes 22 horizontal registers of 16 bits. The horizontal output lines $x1$ to $x16$ are connected via gates 402 and the output lines $y1$ to $y22$ of vertical decoder 396 are connected via gates 404 to the character register 400. The gates 402 and 404 both include timing inputs 406 which synchronize the application of the outputs of the decoders and simultaneously enable a bit in the character to be set to its second state from its first state.

The outputs of selected stages of the character register 400 are connected via cable 408 to feature extraction masks 420 which are similar to feature extraction masks 118. The feature extraction masks 410 are connected to combination logic 412 via output lines 414.

Combination logic 412 is similar to the combination logic 120. The combination logic 412 includes output lines 416 and 418 which are pulsed by the logic 412 when vertical registration and/or horizontal registration are not made.

Output lines 416 and 418 are each connected to an input of an OR gate 420. The output of gate 420 is connected to both a vertical shift counter 421 and a horizontal shift counter 423. The vertical and horizontal shift counters are adapted to shift the character information in the character register until the character is properly aligned with the feature extraction masks so that the character or characters can be identified. Thus, if the character in the character register 400 is not vertically or horizontally aligned, the combination logic 412 provides a signal on either or both of lines 416 and 418 which is passed via gate 420 to a vertical shift counter 421 and a horizontal shift counter 423 and thereby shifts the character within the character register 400 until registration is made. If registration is not made, a signal indicating non-registration is transmitted back to the data set at which the information was generated. The output of the combination logic 412 is connected to a recognition register 424 via a plurality of gates 422. Each of gates 422 includes an input connected to a timing signal input line. The output of recognition register 424 is connected to a code generator 428, which converts the output signals from register 424 to a binary coded representation of the character recognized. The output lines of the code generator 428 are each connected to one of the nine gates 430 which are in turn each connected to a different stage of output register 432. The output register is connected to a transmitter which then transfers the character stored therein to the data set which generated the same. If the operator at the data set which receives the character, does not press the re-entry button on the data set, the character is then also transmitted to the data processor storage unit therefor.

Thus, if the combination logic 412 does make registration and recognizes a character, it is fed via output gates 422 to recognition register 424. The gates 422 are strobed by timing control signal inputs to line 426 which enable gates 422. Each time gates 422 are enabled, the output signals from combination logic 412 are passed if a character is recognized. The output of recognition register 424 is passed to code generator 428 which converts the output of the recognition register to the machine code which is transferred via gates 430 to output register 432. The contents of the output register 432 are then transmitted back to the data set which transmitted the character signals and it is exhibited on the character display 40 provided in the data set.

Registers 308 and 310 are associated with gates 434 and 436, respectively. The inputs of gates 434 and 436 are connected to control circuitry of the data processor which provides at the beginning of each character cycle, input pulses thereto which clear registers 308 and 310, respectively. The control circuitry is also responsive to the delta detectors 354 and 356 as well as the inputs to receivers 250 and 252 for providing control signals to route the data through the system.

The operation of the data entry system is as follows:

To initially start the operation of the data entry system, control signals are applied to the first and second receivers 250 and 252 to clear the registers therein and to registers 308 and 310 via gates 434 and 436 to clear the contents therein. Control signals are also applied to the receiver address registers 384, 386 . . . of the receiver address memory 382 to clear the contents thereof. The system is thereby set to initiate operation. The data from each of the data sets is separated from each other by means of time division multiplexing. That is, the data received by the system is separated into time slots. The time slots are indexed by counter 362 which is stepped at the duration of each of the time slots. Thus, for example, during the first slot associated with receiver #1, the counter would be at a first count. At the end of the time slot assigned to receiver #1, the counter would be stepped to the second count and thereby indicate that the second time slot is in operation for the reception of data at receiver #2.

The timing control signals applied to the analog gates 254, 256, 258 and 260 and similarly the analog gates associated with any additional receivers used are provided with strobe pulses in accordance with the count in counter 362. Thus, during a first cycle, lines 262 and 264 to analog gates 254 and 256, respectively, are pulsed simultaneously during a first time slot. If receiver #1 has received signals from the data set associated therewith, analog gates 254 and 256 pass the signals to the A/D converters 296 and 298, respectively. That is, if the PEN DOWN signal is generated on line 278, the timing pulse on line 286 enables gate 280 to pass an enabling signal to gate 290. Gate 290 passes this signal to gate 292 which in turn enables A/D converters 296 and 298 to receive and convert the analog signals representative of the position of the pen from receiver #1. If receiver #1 has not yet received a signal from the data set, the analog gates 254 and 256 would thereby be unaffected by the strobe pulses. After the end of the first time slot in the first cycle, the lines 270 and 272 are pulsed to enable analog gates 258 and 260 associated with receiver #2 to pass any signal received thereby. Similarly, after the end of the second time slot, the timing input lines to similar analog gates for a third receiver are pulsed and so on throughout the remainder of the cycle. During the first cycle, the counter 362 is continually stepped at the duration of each of the time slots. After the end of the first complete cycle of time slots, the counter 362 is then recycled to its first count so that the timing input lines 262 and 264 of analog gates 254 and 256 are again pulsed.

Assuming that the first receiver 250 has just received signals as a result of the operator having placed the pen on the dot in the box of the printed sheet used on the platen of the data set, the analog gates 254 and 256 pass the signals representative of x and y coordinates to A/D converters 296 and 298. The A/D converters convert these signals to digital signals and pass them to registers 308 and 310, respectively. The address lines 366, since they receive the present count in counter 362 which is stepped to the first count cause read out of the first location in the memory associated with receiver #1. Since no previous information had been received, the first storage position associated with receiver #1 in magnetic core memory 332 is blank thereby providing no reference coordinates to the registers 326 and 330. Thus, the first coordinates received by the first receiver 250 are transferred to the sum registers 342 and 350 without any consequent subtraction by the adder networks 318 and 320.

Since the counter 362 is still at the count associated with the first time slot, the first coordinates are stored at the first position associated with receiver #1 in magnetic core memory 332. The address lines 390 enable the storage of the coordinates in the first storage position since the receiver #1 address register 384 of receiver address memory 382 is still blank in that the register has not yet been incremented.

After the duration of the first time slot, the analog gates 258 and 260 are strobed. If no character has been started in the data set associated with receiver #2, no signal is passed on lines 274 and 276 to the A/D converters 296 and 298.

When the counter 362 is recycled to the first count, the analog gates 254 and 256 are again strobed by pulse signals applied to lines 262 and 264. When the operator's pen of the data set associated with receiver #1 has moved to the first portion of the character to be written, the analog gates 254 and 256 pass the coordinate signals representative of the new location to the A/D converters 296 and 298, respectively, as the strobe signals for the first time slot are applied to the analog gates 254 and 256. The coordinate signals from the A/D converters are gated to the x and y registers 308 and 310, respectively. Since the counter 362 is at its first count, the first storage position associated with receiver #1 in magnetic core memory 332 is read out to the x and y reference registers 326 and 330, respectively. As will be remembered, the signals registered therein are representative of the location of the dot in the box. The new contents of registers 326 and 330 are then subtracted by the adder networks 318 and 320 from the contents of registers 316 and 322, respectively, and the results stored in the sum registers 342 and 350. The delta detectors 354 and 356 detect that the coordinates have changed and thereby provide a signal via lines 357 to the receiver address memory 382 an increment which increases by one (1) the number stored in receiver #1 address register 384. Thus, the new count in address register 384 is one. The receiver decoder 368 provides an enabling signal on lines 370 which thereby enables the passage of the content of register 384 to address lines 390. The signals on address lines 390 and 366 thus combine to provide an address representative of a second position in magnetic core memory 332 associated with receiver #1.

The x coordinate and y coordinate stored in sum registers 342 and 350 are thus transferred to this second position associated with receiver #1 in magnetic core memory 332. As the counter 362 recycles, further coordinates from receiver #1 are provided to the registers 308 and 310 during the first time slot of each cycle. These coordinate signals are constantly subtracted from by the first coordinates provided to the magnetic core memory 332. That is, during the first time slot of each cycle, the contents of the first position corresponding to receiver #1 is read out of memory 332 to registers 326 and 330. When the delta detectors 354 and 356 detect that a coordinate received from receiver #1 is not within the same box as had been the previous coordinates, which thereby means that the character is completed, the delta detectors 354 and 356 generate a signal on lines 359 which cause the magnetic core memory to read out each of the positions in the magnetic core memory associated with the receiver in the time slot in which the end of character has been completed.

Thus, during the first time slot, the determination of the completion of a character would cause the magnetic core memory to be read out in each of the storage positions associated with the first receiver 250. The receiver #1 address register 384 is also cleared at this time. The coordinates are read out of the magnetic core memory to the horizontal and vertical decoders 392 and 396, respectively. This, in effect, "dumps" all of the positions traversed by the pen in the data set associated with the receiver #1 into character register 400. The first character is then analyzed by the character recognition circuitry and the output register 432 then transmits the recognized character to the data set associated with the first receiver 250.

Similarly, at the determination of the end of a character in the data set associated with the second register 252, the contents of the magnetic core memory associated with receiver #2 are read out to the horizontal and vertical decoders 392 and 396, respectively, and the character in the second receiver is thereby analyzed by the recognition circuitry during the time slot associated with receiver #2. The transmitter associated with the output register 432 then transmits the recognized character to the data set in which the character was originally written.

It can be seen that the delta detectors 354 and 356 enable the coordinates generated by a data set to be stored at sequential positions within the magnetic core memory 332, associated with the receiver that received the coordinate signals.

During the generation of the character in the data set associated with receiver #1, the receiver #1 address register 384 is incremented by one each time the delta detector determines that a new position has been reached by the pen. Similarly, during time slots between the time slots associated with only the first receiver 250, the remaining receiver address registers 386 . . . are incremented as the generation or writing of the character progresses. The counter 362 insures that each set of coordinates is transmitted to the portion of the magnetic core memory associated only with the receiver at which the coordinates are generated. The receiver decoder 368 enables only the gates associated with the receiver which is being strobed during the time slot so that only the address register associated with that receiver can provide the address in storage for the next set of coordinates received for the selected receiver.

It can be seen that by means of the multiplexing, the data entry system can accommodate a great number of data sets. The amount of time required in handprinting a character is so long in comparison to the amount of time that is required for recognizing the character that the number of data sets that are usable with this system is extensive.

While time division multiplexing has been used in this system, it should be understood that it is within the scope of this invention that other multiplexing techniques may be used for simultaneously processing the entry of data from a large number of data sets. For example, the receivers 250, 252, etc. may be provided with tagging circuits for identifying the coordinates generated by different data sets.

As hereinbefore seen, the data entry system is thus adaptable to any situation where a large number of data sets for the entry of handprinted data is required to a data processor. The unique checking of the data entered in the data processor enables the system to be used directly with a computer for accounting functions as well as functions in which errors cannot be tolerated.

Without further elaboration, the foregoing will so fully illustrate my invention that others may, by applying current or future knowledge, readily adapt the same for use under various conditions of service.

What is claimed as the invention is:

1. An input device for entering handwritten data into a data processor having recognition circuitry, said device comprising means for manually writing characters, means for converting the position of said means for writing into a machine usable signal and transmitting said signal to said data processor, and display means responsive to the recognition circuitry in said data processor for displaying the data recognized by said data processor so that the data inserted into said data processor is subject to a visual check.

2. The invention of claim 1 wherein said input device further includes means for enabling re-entering of data, said means for re-entering connected to said data processor to erase incorrectly received data and substitute the re-entered data so that data incorrectly received by said data processor may be erased and the correct data re-inserted.

3. The invention of claim 1 wherein said input device further includes instruction displays, said displays being controlled by said data processor.

4. The invention of claim 1 wherein said input device includes a writing area and a display area for said display means, said writing area being substantially planar and said display area being provided adjacent said writing area with said display means disposed to face the operator of said device.

5. The invention of claim 1 wherein said recognition circuitry comprises means for sampling the signals corresponding to the position of said writing means and generating signals indicative of the discrete positions through which said writing means passes, storage means for temporarily storing said signals corresponding to said positions and recognition means responsive to said storage means for recognizing the characters written by said writing means.

6. The invention of claim 5 wherein said data processor further includes means responsive to said signals corresponding to the positions of said writing means for determining the end of a character.

7. The invention of claim 5 and further including means in said data processor for determining a change in position of said writing means, said means for determining being responsive to said signals corresponding to the positions of said writing means.

8. The invention of claim 5 wherein said input device further includes a printed sheet having rectangular boxes in which characters may be written, each of said boxes further including a dot located at the same position within each box so that touching said dots with said writing means enables said recognition circuitry to generate reference coordinates to indicate the position of the box which includes the character being written.

9. The invention of claim 8 wherein said data processor includes means for storing said reference coordinates, said reference coordinates being continually subtracted in said data processor from said signals corresponding to the position of said writing means in the box of said reference coordinates so that signals representative of the relative position of said writing means within said box are generated for use by the recognition circuitry.

10. A data processing system comprising a plurality of data input devices and a data processor having recognition circuitry, transmission means for connecting said data input devices to said data processor, each of said data input devices including means for manually writing characters and means for converting the position of said means for writing into a machine unsable signal and transmitting said signal via said transmission means to said data processor, said data input devices each including display means responsive to said recognition ciruitry of said data processor for exhibiting the character last recognized by said recognition circuitry written on said data input device.

11. The invention of claim 10 wherein said data processor further includes a multiplexor so that each of said data sets may be used simultaneously for the entry of data into said data processing system.

12. The invention of claim 11 wherein said multiplexor comprises means for sampling sequential signals received from each of said data input devices, means responsive to said sampling means for generating signals representative of the position of said writing means in accordance with signals sampled, and intermediate storage means for storing said signals corresponding to the position of said writing means so that a complete character may be stored for each of said data sets prior to transfer of said signals for recognition thereof.

13. The invention of claim 12 said data processor further includes a character register, said character register having disrete portions corresponding to each of the positions through which a character may be written, and means for transferring the signals comprising a character from said intermediate storage to said character register upon completion of said character in said input device.

14. The invention of claim 11 wherein each of said data input devices is assigned a specific and different time slot than the other input devices for the reception of data generated therein by said data processor, so that separation and identification of said data from said plurality of data sets is facilitated.

References Cited

UNITED STATES PATENTS

| | | | |
|---|---|---|---|
| 3,108,254 | 10/1963 | Dimond | 340—146.3 |
| 3,111,646 | 11/1963 | Harmon | 340—146.3 |
| 3,127,588 | 3/1964 | Harmon | 340—146.3 |
| 3,133,266 | 5/1964 | Frishkopf | 340—146.3 |
| 3,241,120 | 3/1966 | Amdahl | 340—172.5 |
| 3,248,705 | 4/1966 | Dammann et al. | 340—172.5 |
| 3,303,465 | 2/1967 | Essinger et al. | 340—146.3 |
| 3,323,119 | 5/1967 | Barcomb et al. | 340—172.5 |
| 3,371,321 | 2/1968 | Adams | 340—172.5 |
| 3,376,551 | 4/1968 | Armbruster | 340—172.5 |
| 3,399,401 | 8/1968 | Ellis et al. | 340—172.5 |

PAUL J. HENON, Primary Examiner

U.S. Cl. X.R.

340—146.3